United States Patent
Asami et al.

(10) Patent No.: US 8,355,857 B2
(45) Date of Patent: Jan. 15, 2013

(54) CONTROL APPARATUS OF INTERNAL COMBUSTION ENGINE FOR VEHICLE

(75) Inventors: Yoshikazu Asami, Susono (JP); Toshio Inoue, Gotenba (JP); Masakiyo Kojima, Susono (JP); Takashi Suzuki, Gotenba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 483 days.

(21) Appl. No.: 12/756,280

(22) Filed: Apr. 8, 2010

(65) Prior Publication Data

US 2010/0300386 A1 Dec. 2, 2010

(30) Foreign Application Priority Data

May 27, 2009 (JP) .................................. 2009-127248

(51) Int. Cl.
 *F02D 13/02* (2006.01)
 *F01L 1/34* (2006.01)
(52) U.S. Cl. .................................... 701/103; 123/90.15
(58) Field of Classification Search ................. 701/103, 701/101, 102, 112, 115; 123/90.15, 90.16, 123/90.17, 90.11, 90.23
See application file for complete search history.

(56) References Cited

U.S. PATENT DOCUMENTS

| 5,529,031 | A | * | 6/1996 | Yoshioka | 123/90.15 |
| 7,267,104 | B2 | * | 9/2007 | Watanabe et al. | 701/112 |
| 7,426,913 | B2 | * | 9/2008 | Arinaga et al. | 123/90.16 |
| 7,444,975 | B2 | | 11/2008 | Kishi et al. | |
| 2010/0154740 | A1 | * | 6/2010 | Mitsuishi | 123/90.15 |

FOREIGN PATENT DOCUMENTS

| JP | 9-137205 U | | 12/1992 |
| JP | 2004-204816 A | | 7/2004 |
| JP | 2004332662 A | | 11/2004 |
| JP | 2006138292 A | | 6/2006 |
| JP | 2007218114 A | * | 8/2007 |
| JP | 2007218114 A | | 8/2007 |
| JP | 2010196572 A | * | 9/2010 |

OTHER PUBLICATIONS

Office Action issued May 10, 2011, during the prosecution of corresponding Japanese Patent Application No. 2009-127248.
Office action from Japanese Patent Application No. 2009-127248 issued Jul. 25, 2011.

* cited by examiner

*Primary Examiner* — Hieu T Vo
(74) *Attorney, Agent, or Firm* — Gifford, Krass, Sprinkle, Anderson & Citkowski, P.C.

(57) ABSTRACT

A control apparatus for an internal combustion engine of a vehicle sets the overlap amount of an intake valve and an exhaust valve small when the engine is idling and the vehicle is stopped. Also, the control apparatus sets the overlap amount large using normal control when the vehicle is traveling, even if the engine is idling.

9 Claims, 7 Drawing Sheets

CONTROL APPARATUS OF INTERNAL COMBUSTION ENGINE FOR VEHICLE

INCORPORATION BY REFERENCE

The disclosure of Japanese Patent Application No. 2009-127248 filed on May 27, 2009 including the specification, drawings and abstract is incorporated herein by reference in its entirety.

BACKGROUND OF THE INVENTION

1. Field of the Invention

The invention relates to a control apparatus of an internal combustion engine mounted in a vehicle. More particularly, the invention relates to improving control for suppressing vibration in an internal combustion engine that is provided with a variable valve timing mechanism.

2. Description of the Related Art

In an internal combustion engine (hereinafter also referred to simply as an "engine") mounted in a vehicle or the like, rotation of a crankshaft is transmitted to a camshaft via a timing belt or the like. Valves (i.e., intake valves and exhaust valves) provided in a valve system of the engine move up and down by being cyclically pushed down by cams on the camshaft, thereby opening and closing the intake and exhaust passages.

Also, one known valve system of an engine is equipped with a variable valve timing (VVT) mechanism to improve engine output, the fuel consumption rate, and emissions and the like is known (see Japanese Patent Application Publication No. 2006-138292 (JP-A-2006-138292) and Japanese Patent Application Publication No. 2004-332662 (JP-A-2004-332662)).

This variable valve timing mechanism changes the valve opening/closing timing by changing the rotation phase of the camshaft with respect to the crankshaft. One generally known variable valve timing mechanism is a vane type variable valve timing mechanism. This vane type variable valve timing mechanism includes, for example, a housing with concave portions formed on the inner peripheral surface, and an internal rotor that has vanes that divide the concave portions of the housing into two hydraulic chambers (i.e., a retard side hydraulic chamber and an advance side hydraulic chamber) each. Also, the vane type variable valve timing mechanism is structured such that the housing receives rotative force from the crankshaft via a timing belt or the like, and the internal rotor is connected to the camshaft. The valve opening/closing timing is continuously changed by changing the rotation phase of the crankshaft and the camshaft, which is done by controlling the hydraulic pressure supplied to the retard side hydraulic chamber and the advance side hydraulic chamber with an oil control valve (OCV).

The oil control valve is formed by a spool arranged so as to be able to move back and forth inside a casing, a compression coil spring that applies urging force to the spool, and an electromagnetic solenoid that attracts the spool when voltage is applied, and the like. The voltage applied to the electromagnetic solenoid is duty controlled. The attraction force generated by the electromagnetic solenoid changes according to the duty ratio of the applied voltage. As the duty ratio of the voltage applied to the electromagnetic solenoid increases, the amount of hydraulic pressure supplied to the advance side hydraulic chamber increases, and as that duty ratio decreases, the amount of hydraulic pressure supplied to the retard side hydraulic chamber increases. In this way, the variable valve timing mechanism is driven by adjusting the hydraulic pressures in the advance side hydraulic chamber and the retard side hydraulic chamber.

Operation of the variable valve timing mechanism involves adjusting the hydraulic pressures in the advance side hydraulic chamber and the retard side hydraulic chamber to set the overlap amount of the intake valve and the exhaust valve large when the engine is operating at high speed and small when the engine is operating at low speed.

Also, JP-A-2006-138292 states that the overlap amount is set extremely small when the engine is idling. Also, JP-A-2004-332662 states that the exhaust valve and the intake valve are controlled so that there is a negative overlap in which both the exhaust valve and the intake valve are closed from the exhaust stroke through the intake stroke when the engine is idling.

In JP-A-2006-138292 and JP-A-2004-332662 described above, regardless of the running state of the vehicle, when the engine is idling, the variable valve timing mechanism sets the overlap amount extremely small (JP-A-2006-138292), or controls the overlap to a negative overlap (JP-A-2004-332662). Therefore, for example, when the driver is not depressing the accelerator such that the accelerator operation amount is zero, and the vehicle speed is relatively low and the transmission is in a neutral state while the vehicle is traveling, the engine idles, so from this point, the overlap amount is set extremely small or is controlled to a negative overlap.

Incidentally, while the vehicle is traveling in this way, the driver may depress the accelerator, thus increasing the engine load. However, with the control in JP-A-2006-138292 and JP-A-2004-332662, the overlap amount is set extremely small or controlled to a negative overlap when the engine starts to idle, which makes it difficult to quickly obtain an overlap amount suitable for an increase in engine load. That is, the engine speed increases as the engine load increases while the vehicle is traveling, but the overlap amount is unable to be adjusted appropriately so the optimum overlap amount is unable to be quickly obtained.

One way to solve this problem is to keep the overlap amount large (i.e., to keep the overlap amount at an overlap amount that is suitable for a high engine speed) even if the engine is idling. However, if the vehicle is stopped after the driver releases the accelerator while the vehicle is still traveling, the overlap amount will be larger than the proper amount when the vehicle is stopped. As a result, vibration from the engine that is caused by the overlap amount being larger than the proper amount is transmitted to the vehicle cabin, which is unpleasant for occupants. (It is known that when the overlap amount is larger than the proper amount, combustion becomes unstable due to the effects of internal EGR and the like, and engine vibration tends to increase.) In particular, the majority of the vibration that is transmitted to the vehicle cabin while the vehicle is stopped is vibration from the engine, so a large amount of engine vibration is undesirable.

SUMMARY OF THE INVENTION

The invention therefore provides a control apparatus of an internal combustion engine for a vehicle, that is capable of appropriately controlling the valve timing in an internal combustion engine provided with a variable valve timing mechanism.

In one aspect of the invention, a valve timing is controlled to a vibration-reducing valve timing in which the overlap amount of an intake valve and an exhaust valve is set small (or large), for example, when two conditions, one being that an internal combustion engine is idling and the other being that a vehicle is stopped, are satisfied. As a result, vibration of the internal combustion engine when the vehicle is stopped can be reduced.

More specifically, a first aspect of the invention presumes a control apparatus for an internal combustion engine of a vehicle, that is provided with an intake passage that is communicated with a combustion chamber, an exhaust passage that is communicated with the combustion chamber, an intake valve that selectively opens and closes communication between the combustion chamber and the intake passage, an exhaust valve that selectively opens and closes communication between the combustion chamber and the exhaust passage, and a variable valve timing mechanism that is provided for at least one of the intake valve or the exhaust valve and adjusts valve timing. This control apparatus is provided with a valve timing control device that controls the variable valve timing mechanism to set the valve timing to a vibration-reducing valve timing when the internal combustion engine is idling and the vehicle is stopped.

In this case, the vibration-reducing valve timing may be, for example, i) a valve timing in which the overlap amount of the intake valve and the exhaust valve from the exhaust stroke through the intake stroke is set smaller than the overlap amount when the internal combustion engine is not idling, or ii) a valve timing that results in a negative overlap in which the intake valve and the exhaust valve are both closed from the exhaust stroke through the intake stroke.

In these cases, making the overlap amount of the intake valve and the exhaust valve small when the vehicle is stopped reduces internal EGR, which increases the combustion stability, in turn reducing the vibration of the internal combustion engine. Also, the valve timing will not be set to the vibration-reducing valve timing when the vehicle is traveling, even if the internal combustion engine is idling. Therefore, when the load of the internal combustion engine is increased by the driver depressing the accelerator or the like while the vehicle is traveling, and the speed of the internal combustion engine increases as a result, a valve timing that corresponds to that increase (i.e., a valve timing at which a large overlap amount can be obtained) can be quickly obtained. In this way, according to this first aspect of the invention, vibration of the internal combustion engine while the vehicle is stopped can be reduced and the appropriate valve timing while the vehicle is traveling can be maintained.

More specific examples of the valve timing control by the valve timing control device are described below. First, the valve timing control device may cancel the setting in which the valve timing is set to vibration-reducing valve timing when the state of the vehicle changes from one in which the vehicle is stopped with the internal combustion engine idling to one in which the vehicle starts to take off with the internal combustion engine idling.

Also, the valve timing control device may cancel the setting in which the valve timing is set to the vibration-reducing valve timing and increase the overlap amount of the intake valve and the exhaust valve when the state of the vehicle changes from one in which the vehicle is stopped with the internal combustion engine idling to one in which the vehicle starts to take off with the internal combustion engine idling.

Typically, when the vehicle starts to take off from a standstill, the accelerator operation amount is increased by the driver depressing the accelerator, and the engine speed increases. In this case, a valve timing that corresponds to the increase in the engine speed (i.e., a valve timing that sets the overlap amount larger as the engine speed increases) can be quickly obtained by canceling the vibration-reducing valve timing setting (i.e., the control that sets the overlap amount smaller) when the vehicle starts to take off from a standstill. As a result, good acceleration performance after the vehicle takes off can be maintained.

Also, the vibration-reducing valve timing may be a valve timing in which the overlap amount of the intake valve and the exhaust valve from an exhaust stroke through an intake stroke is set larger than the overlap amount when the internal combustion engine is not idling.

In this case, setting the valve timing to the vibration-reducing valve timing by increasing the overlap amount of the intake valve and the exhaust valve when the vehicle is stopped reduces the vibration of the internal combustion engine. That is, increasing the overlap amount increases the actual compression ratio and increases combustion stability, in turn reducing vibration of the internal combustion engine. Also, the vibration-reducing valve timing is not set when the vehicle is traveling, even if the internal combustion engine is idling. Therefore, when the load of the internal combustion engine is increased by the driver depressing the accelerator or the like while the vehicle is traveling, and the speed of the internal combustion engine increases as a result, a valve timing that corresponds to that increase (i.e., a valve timing at which an overlap amount that corresponds to the speed of the internal combustion engine can be obtained) can be quickly obtained. In this way, according to this first aspect of the invention, vibration of the internal combustion engine while the vehicle is stopped can be reduced and the appropriate valve timing while the vehicle is traveling can be maintained.

A specific example of valve overlap control that sets the overlap amount large as the vibration-reducing valve timing described above is described below. That is, the setting in which the valve timing is set to the vibration-reducing valve timing may be canceled and the overlap amount of the intake valve and the exhaust valve may be decreased when the state of the vehicle changes from one in which the vehicle is stopped with the internal combustion engine idling to one in which the vehicle starts to take off with the internal combustion engine idling.

Typically, when the vehicle starts to take off from a standstill, the accelerator operation amount is increased by the driver depressing the accelerator, and the engine speed increases. In this case, a valve timing that corresponds to when the vehicle is traveling can be quickly obtained by canceling the vibration-reducing valve timing setting (i.e., the control that sets the overlap amount large) when the vehicle starts to take off from a standstill. As a result, good acceleration performance after the vehicle takes off can be maintained.

In the first aspect of the invention, the valve timing is controlled to the vibration-reducing valve timing when the internal combustion engine is idling and the vehicle is stopped. As a result, vibration of the internal combustion engine while the vehicle is stopped can be reduced, which in turn enables engine vibration that is transmitted to the vehicle cabin to be reduced. As a result, discomfort to occupants can be reduced.

A second aspect of the invention relates to a control apparatus for an internal combustion engine of a vehicle that includes an intake passage that is communicated with a combustion chamber; an exhaust passage that is communicated with the combustion chamber; an intake valve that selectively opens and closes communication between the combustion chamber and the intake passage; an exhaust valve that selectively opens and closes communication between the combustion chamber and the exhaust passage; a variable valve timing mechanism that is provided for at least one of the intake valve or the exhaust valve and adjusts valve timing; and a valve timing control device that makes the overlap amount of the intake valve and the exhaust valve from an exhaust stroke through an intake stroke when the internal combustion engine is idling and the vehicle is stopped smaller than the overlap amount when the internal combustion engine is idling and the vehicle is traveling.

A third aspect of the invention relates to a control apparatus for an internal combustion engine of a vehicle that includes an intake passage that is communicated with a combustion chamber; an exhaust passage that is communicated with the combustion chamber; an intake valve that selectively opens and closes communication between the combustion chamber and the intake passage; an exhaust valve that selectively opens and closes communication between the combustion chamber and the exhaust passage; a variable valve timing mechanism that is provided for at least one of the intake valve or the exhaust valve and adjusts valve timing; and a valve timing control device that makes the overlap amount of the intake valve and the exhaust valve from an exhaust stroke through an intake stroke when the internal combustion engine is idling and the vehicle is stopped larger than the overlap amount when the internal combustion engine is idling and the vehicle is traveling.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 4 is a block diagram showing the structure of the control system including an ECU and the like;

DETAILED DESCRIPTION OF EMBODIMENTS

Example embodiments of the present invention will be described in greater detail below with reference to the accompanying drawings. This example embodiment describes a case in which the invention is applied to an engine provided with a variable valve timing mechanism for both an intake system and an exhaust system.

First, the engine in the example embodiment will be described.

—Engine—

Figure 1:
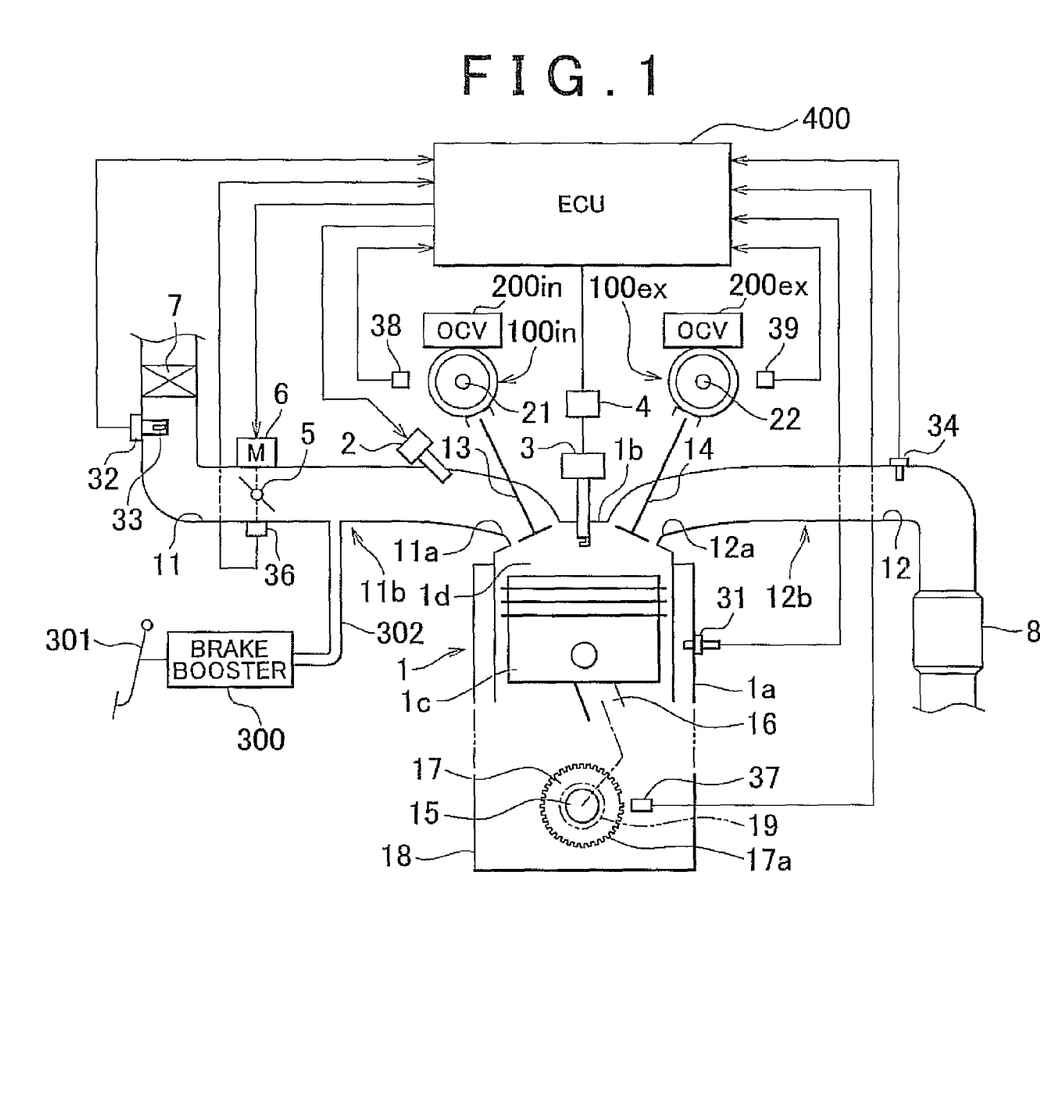
FIG. 1 is a block diagram schematically showing an engine according to an example embodiment of the invention.

FIG. 1 is a block diagram schematically showing an engine 1 according to an example embodiment of the invention. Incidentally, FIG. 1 shows only the structure of one cylinder of the engine 1.

The engine 1 is a port injection type multiple cylinder gasoline engine mounted in a vehicle. A piston 1c that moves reciprocally up and down is provided in a cylinder block 1a that forms the cylinders of the engine. The piston 1c is connected to a crankshaft 15 via a connecting rod 16. The reciprocating motion of the piston 1c is converted into rotary motion of the crankshaft 15 by the connecting rod 16.

A signal rotor 17 is mounted to the crankshaft 15. A plurality of protrusions (i.e., teeth) 17a are provided at equal angles on the outer peripheral surface of the signal rotor 17. A crank position sensor (i.e., an engine speed sensor) 37 is arranged near the side of the signal rotor 17. This crank position sensor 37 is an electromagnetic pickup, for example, that generates a pulse signal (i.e., an output pulse) corresponding to the protrusions 17a of the signal rotor 17 when the crankshaft 15 rotates.

A coolant sensor 31 that detects the coolant temperature is arranged in the cylinder block 1a of the engine 1. Also, a cylinder head 1b is provided on the upper end of the cylinder block 1a. A combustion chamber 1d is formed between this cylinder head 1b and the piston 1c. A spark plug 3 is arranged in the combustion chamber 1d of the engine 1. The ignition timing of the spark plug 3 is adjusted by an igniter 4.

An oil pan 18 that collects lubricating oil is provided on the lower portion of the cylinder block 1a of the engine 1. When the engine 1 is operating, lubricating oil collected in this oil pan 18 is drawn up by an oil pump 19 through an oil strainer 20 (see FIG. 3) that removes foreign matter, and supplied to the piston 1c, the crankshaft 15, and the connecting rod 16 and the like, where it is used to lubricate and cool various parts. After being used to lubricate and cool the various parts of the engine 1, the lubricating oil is returned to the oil pan 18 where it collects until it is again drawn up by the oil pump 19.

Also, in this example embodiment, the lubricating oil collected in the oil pan 18 is also used as operating oil for variable valve timing mechanisms (hereinafter simply referred to as "VVTs") 100$in$ and 100$ex$ that will be described later. Incidentally, the oil pump 19 is a mechanical pump that is driven by the rotation of the crankshaft 15 of the engine 1.

An intake passage 11 and an exhaust passage 12 are connected to the combustion chamber 1d of the engine 1. A portion of the intake passage 11 is formed by an intake port 11a and an intake manifold 11b. Also, a portion of the exhaust passage 12 is formed by an exhaust port 12a and an exhaust manifold 12d.

An air cleaner 7, a hot-wire airflow meter 32, an intake air temperature sensor 33 (inside the airflow meter 32), and an electronically controlled throttle valve 5 for adjusting the amount of intake air of the engine 1, and the like are arranged in the intake passage 11. The throttle valve 5 is driven by a throttle motor 6. The opening amount of the throttle valve 5 is detected by a throttle opening amount sensor 36. An $O_2$ sensor 34 that detects the oxygen concentration in the exhaust gas, and a three-way catalyst 8 are arranged in the exhaust passage 12 of the engine 1.

Also, a brake booster 300 is connected via a negative pressure introducing passage 302 to the intake passage 11 (i.e., the intake manifold 11b) of the engine 1. The brake booster 300 operates by intake pipe vacuum (i.e., intake manifold vacuum) and assists with the depression operating force (braking force) of a brake pedal 301. The assist force generated by the brake booster 300 is supplied to a wheel cylinder via a master cylinder, and becomes braking force to stop the wheels from rotating.

An intake valve 13 is provided between the intake passage 11 and the combustion chamber 1d. Driving this intake valve 13 open and closed opens and closes communication between the intake passage 11 and the combustion chamber 1d. Also, an exhaust valve 14 is provided between the exhaust passage 12 and the combustion chamber 1d. Driving this exhaust valve 14 open and closed opens and closes communication between the exhaust passage 12 and the combustion chamber 1d. The intake valve 13 is driven open and closed by the rotation of an intake camshaft 21 to which the rotation of the crankshaft 15 is transmitted via a timing belt or the like. Similarly, the exhaust valve 14 is driven open and closed by the rotation of an exhaust camshaft 22 to which the rotation of the crankshaft 15 is transmitted via a timing belt or the like. The intake side VVT 100in is provided on the end portion of the intake camshaft 21 and the exhaust side VVT 100ex is provided on the end portion of the exhaust camshaft 22. The intake side VVT 100in and the exhaust side VVT 100ex will be described later.

Moreover, a cam position sensor 38 is arranged near the intake camshaft 21, and a cam position sensor 39 is arranged near the exhaust camshaft 22. The cam position sensor 38 is an electromagnetic pickup, for example, that is arranged facing a single protrusion, not shown, provided integrally with the intake camshaft 21, and outputs a pulse signal when that camshaft 21 rotates. Similarly, the cam position sensor 39 is an electromagnetic pickup, for example, that is arranged facing a single protrusion, not shown, provided integrally with the exhaust camshaft 22, and outputs a pulse signal when that camshaft 22 rotates. Incidentally, the intake camshaft 21 and the exhaust camshaft 22 rotate at ½ the rotation speed of the crankshaft 15, so the cam position sensors 38 and 39 each generate one pulse signal each time the crankshaft 15 rotates 720°.

A fuel injector for injecting fuel (i.e., a fuel injection valve) 2 is arranged in the intake passage 11. Fuel is supplied from a fuel tank at a predetermined pressure to the fuel injector 2 by a fuel pump, and is injected into the intake port 11a of the intake passage 11. The injected fuel is then mixed with intake air, creating an air-fuel mixture which is then introduced into the combustion chamber 1d of the engine 1. Once introduced into the combustion chamber 1d, the air-fuel mixture is ignited by the spark plug 3 and combusts. The force from the combustion of the air-fuel mixture inside the combustion chamber 1d causes the piston 1c to move in a reciprocating manner, such that the crankshaft 15 rotates. This operating state of the engine 1 is controlled by an electronic control unit (ECU) 400. The control apparatus of an internal combustion engine according to this example embodiment can be realized by a program executed by this ECU 400.

—VVT—

Figure 2:
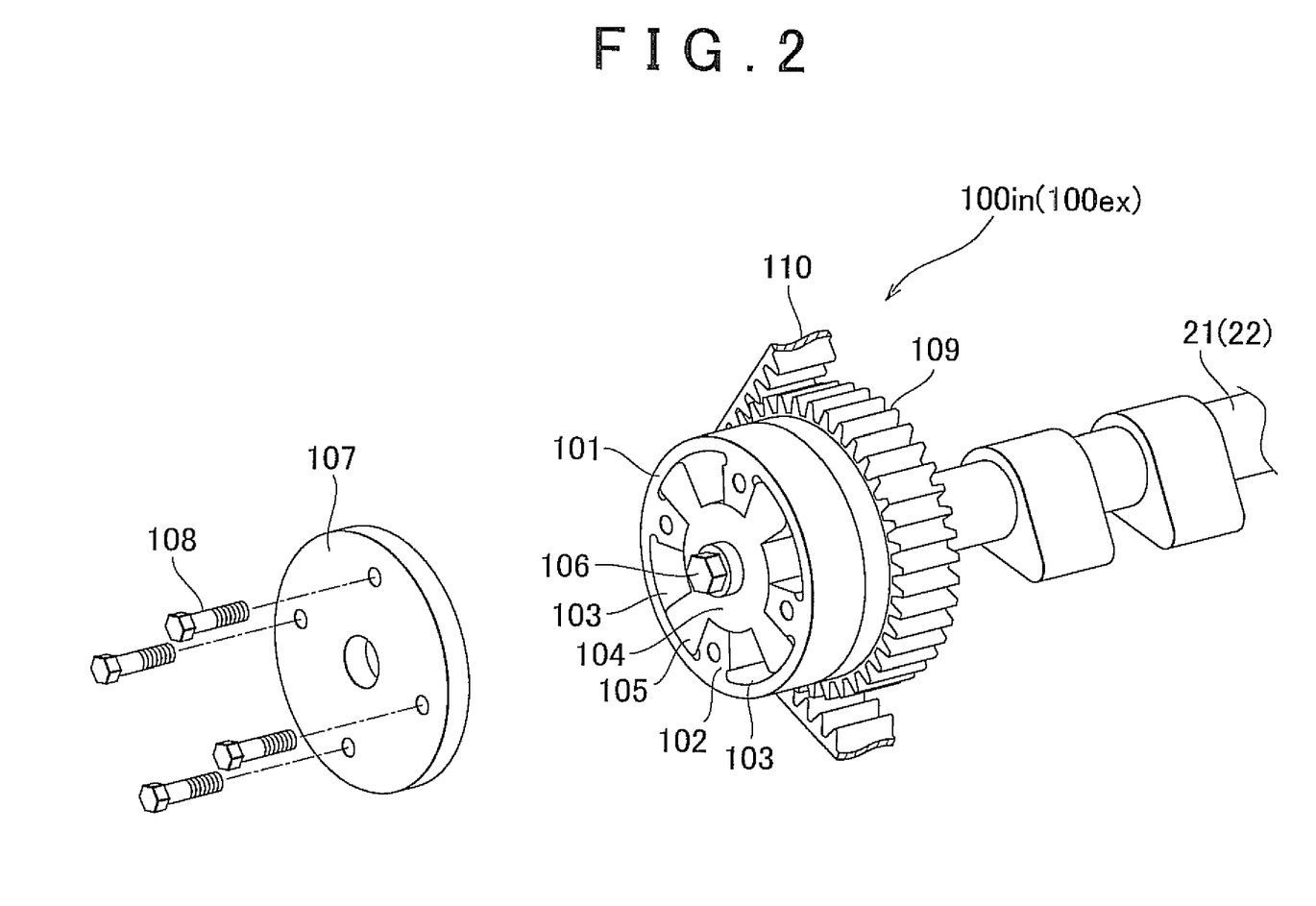
FIG. 2 is a partial perspective view of a VVT mounted in the engine.
Figure 3:
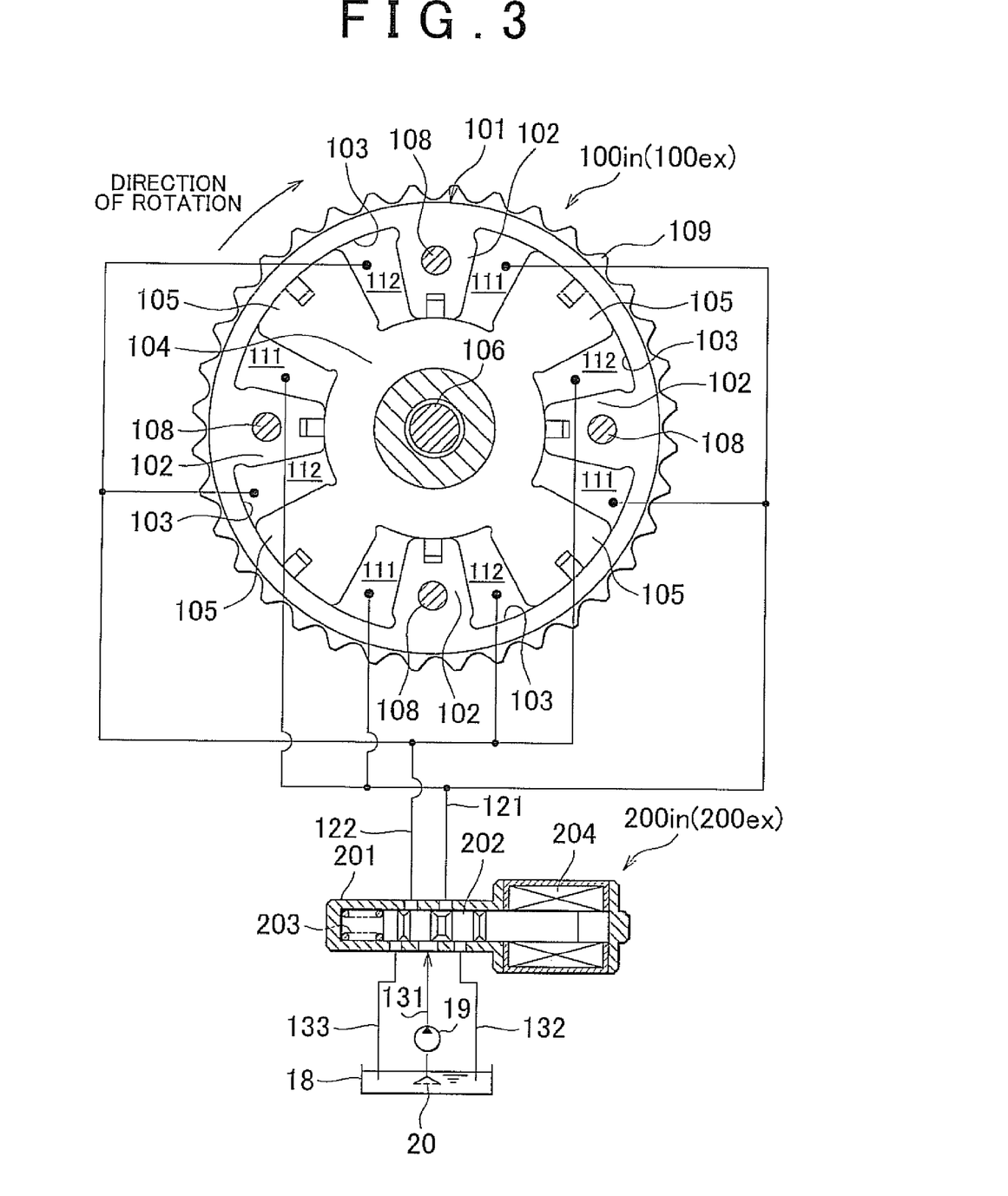
FIG. 3 is a view of the general structure of a hydraulic control system of the VVT and the internal structure of the VVT.

As shown in FIGS. 2 and 3, the intake side VVT 100in and the exhaust side VVT 100ex are each provided with a generally hollow disc-shaped housing 101 and a vane rotor 104 that is rotatably housed inside of this housing 101. A plurality (four in this example) of vanes 105 are integrally formed on the vane rotor 104. The vane rotor 104 is fixed to the intake camshaft 21 (or the exhaust camshaft 22) by a center bolt 106, and thus rotates together with the intake camshaft 21 (or the exhaust camshaft 22).

The front side of the housing 101 is covered by a front cover 107. The housing 101 and the front cover 107 are fixed to a timing pulley 109 by bolts 108, and thus rotate together with the timing pulley 109. The timing pulley 109 is connected to the crankshaft 15 via a timing belt 110.

Protruding portions 102, the number of which is the same as the number of the vanes 105 on the vane rotor 104, are formed inside the housing 101. Each of the vanes 105 on the vane rotor 104 is housed in a concave portion 103 formed between two adjacent protruding portions 102. The tip end surfaces of the vanes slidably contact the inner peripheral surface of the concave portions 103. The pressure of the operating fluid acts on the vanes 105, which causes the vane rotor 104 rotate relative to the housing 101. This relative rotation in turns causes the rotation phase of the intake camshaft 21 (or the exhaust camshaft 22) with respect to the crankshaft 15 to change.

Each concave portion 103 of the housing 101 is divided into two spaces by one of the vanes 105 of the vane rotor 104. Of these two spaces, the space to the rear (i.e., the reverse rotation side) in the direction of rotation of the camshaft (which is the direction of the arrow in FIG. 3) with respect to the vane 105 constitutes an advance side hydraulic chamber 111, and the space to the front (i.e., the rotation side) in the direction of rotation of the camshaft constitutes a retard side hydraulic chamber 112.

With the VVTs 100in and 100ex structured as described above, hydraulic pressure inside the advance side hydraulic chamber 111 and hydraulic pressure inside the retard side hydraulic chamber 112 cause the vane rotor 104 to rotate relative to the housing 101. That is, if the hydraulic pressure inside the advance side hydraulic chamber 111 becomes higher than the hydraulic pressure inside the retard side hydraulic chamber 112, the vane rotor 104 rotates in the direction of rotation of the intake camshaft 21 (or the exhaust camshaft 22) relative to the housing 101. At this time, the rotation phase of the intake camshaft 21 (or the exhaust camshaft 22) advances with respect to the rotation phase of the crankshaft 15. Conversely, if the hydraulic pressure inside the retard side hydraulic chamber 112 becomes higher than the hydraulic pressure inside the advance side hydraulic chamber 111, the vane rotor 104 rotates in the direction opposite the direction of rotation of the intake camshaft 21 (or the exhaust camshaft 22) relative to the housing 101. At this time, the rotation phase of the intake camshaft 21 (or the exhaust camshaft 22) becomes retarded with respect to the rotation phase of the crankshaft 15. The valve timing of the intake valve 13 (or the exhaust valve 14) is able to be varied by adjusting the rotation phase in this way.

Next, the structure of the hydraulic control system that controls the hydraulic pressure of the operating oil supplied to the advance side hydraulic chamber 111 and the retard side hydraulic chamber 112 will be described with reference to FIG. 3.

First, oil control valves (hereinafter, referred to as "OCVs") 200in and 200ex that control the hydraulic pressure of the operating oil supplied to the advance side hydraulic chamber 111 and the retard side hydraulic chamber 112 are connected to the VVT 100in and VVT 100ex, respectively.

Lubricating oil (i.e., operating oil) drawn up through the oil strainer 20 from the oil pan 18 by the oil pump 19 is supplied through an oil supply passage 131 to the OCVs 200in and 200ex. Also, two oil discharge passages 132 and 133 are connected to each OCV 200in and 200ex. The OCVs 200in and 200ex are electromagnetically driven flow control valves that are controlled by the ECU 400.

The OCVs 200*in* and 200*ex* are both four-port valves and include a spool 202 arranged so as to be able to move in a reciprocating manner inside a casing 201, a compression coil spring 203 that applies urging force (i.e., elastic force) to the spool 202, and an electromagnetic solenoid 204. When voltage is applied to the electromagnetic solenoid 204, the spool 202 moves inside the casing 201. The voltage applied to the electromagnetic solenoid 204 is duty controlled by the ECU 400. The attraction force generated by the electromagnetic solenoid 204 changes according to the duty ratio of the applied voltage. The position of the spool 202 is determined by the proportion of the attraction force generated by this electromagnetic solenoid 204 to the urging force of the compression coil spring 203.

The amount that an advance side passage 121 and a retard side passage 122 are communicated with an oil supply passage 131 and an oil discharge passages 132 and 133, and thus the amount of operating oil supplied to the advance side passage 121 and the retard side passage 122, or the amount of operating oil discharged from the advances side passage 121 and the retard side passage 122, is changed by moving the spool 202.

For example, with the intake side OCV 200*in*, as the duty ratio of the voltage applied to the electromagnetic solenoid 204 increases, the amount of operating oil supplied to the advance side passage 121 increases, so the rotation phase of the intake camshaft 21 advances. On the other hand, as the duty ratio decreases, the amount of operating oil supplied to the retard side passage 122 increases, so the rotation phase of the intake camshaft 21 becomes retarded. In this way, the rotation phase of the vane rotor 104 (i.e., the rotation phase of the intake camshaft 21 with respect to the crankshaft 15) can be adjusted by adjusting the hydraulic pressures in the advance side hydraulic chamber 111 and the retard side hydraulic chamber 112. As a result, the valve timing of the intake valve 13 can be appropriately adjusted within a range from the most retarded position to the most advanced position.

Incidentally, with the exhaust side OCV 200*ex* as well, the valve timing of the exhaust valve 14 can be appropriately adjusted within a range from the most retarded position to the most advanced position by duty control, just as with the intake side OCV 200*in*. However, the relationship between the retard and the advance is reverse from what it is with the intake side OCV 200*in*.

The operation of the intake side VVT 100*in* and the exhaust side VVT 100*ex* (i.e., the control of the OCVs 200*in* and 200*ex*) is controlled by the ECU 400. The ECU 400 controls the operation of the VVTs 100*in* and 100*ex* while referencing maps that are set independently for the VVT 100*in* and the VVT 100*ex*, based on the operating state of the engine 1 (e.g., the engine speed and load).

—ECU—

Figure 4:
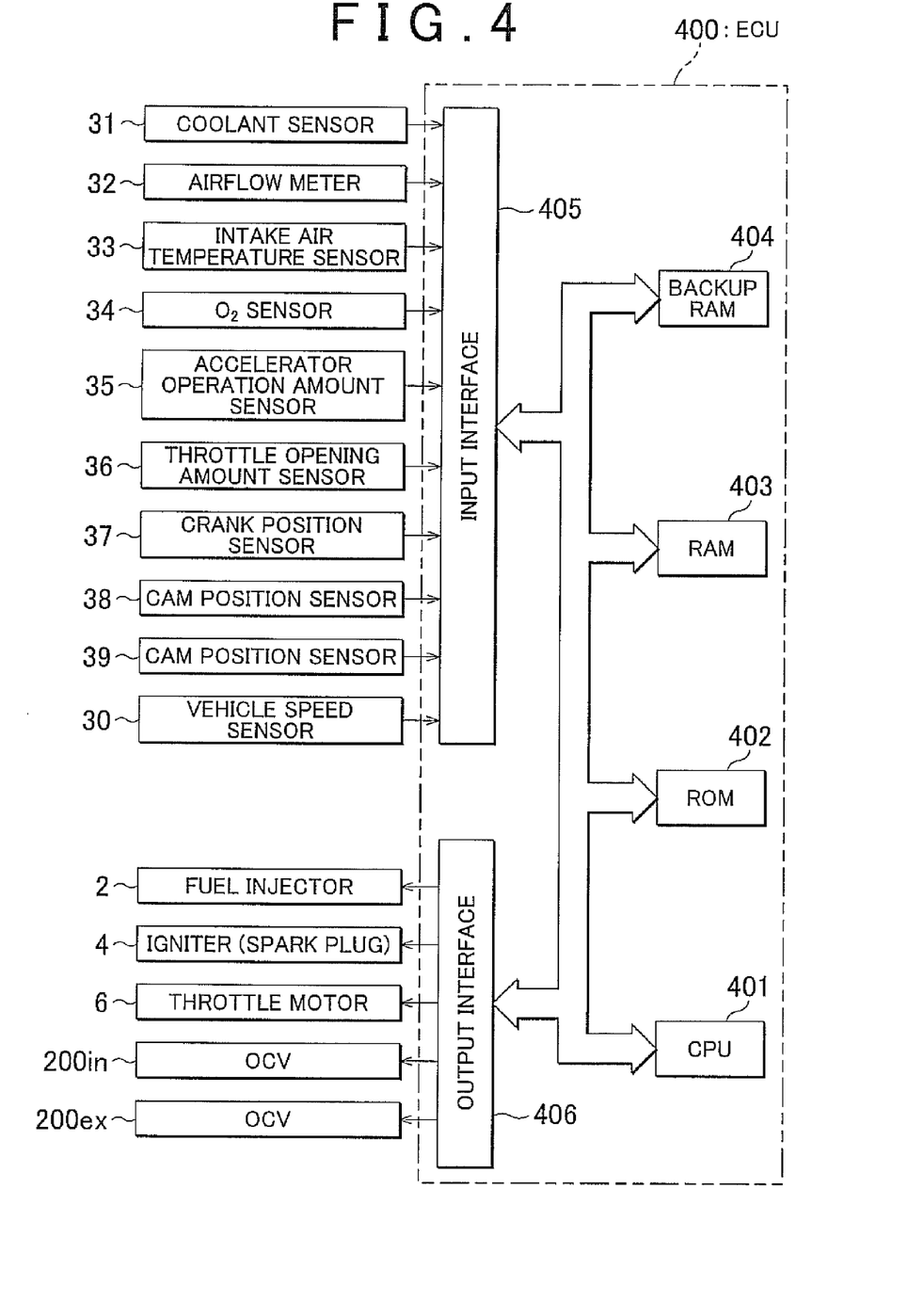

The ECU 400 includes a CPU 401, ROM 402, RAM 403, and backup RAM 404 and the like, as shown in FIG. 4. The ROM 402 stores various control programs as well as maps that are referenced when executing these various control programs, and the like.

The CPU 401 performs calculations based on the various control programs and maps stored in the ROM 402. Also, the RAM 403 is memory that temporarily stores the calculation results of the CPU 401 and data input from the sensors and the like. The backup RAM 404 is non-volatile memory that stores data and the like to be saved when the engine 1 is stopped.

The CPU 401, the ROM 402, the RAM 403, and the backup RAM 404 are all connected to each other as well as to an input interface 405 and an output interface 406 via a bus 407.

Various sensors are connected to the input interface 405. Some of these sensors include the coolant sensor 31, the airflow meter 32, the intake air temperature sensor 33, the $O_2$ sensor 34, an accelerator operation amount sensor 35 that detects the accelerator operation amount, a throttle opening amount sensor 36, the crank position sensor 37, the cam position sensors 38 and 39, and the vehicle speed sensor 30 and the like.

The fuel injector 2, the igniter 4 of the spark plug 3, the throttle motor 6 of the throttle valve 5, and the OCVs 200*in* and 200*ex* and the like are connected to the output interface 406.

The ECU 400 executes various controls of the engine 1, including injection timing control of the fuel injector 2 and ignition timing control of the spark plug 3 and the like, based on output signals from the various sensors described above. The ECU 400 also executes a valve timing setting operation that will be described later.

—Valve Timing Setting Operation—

Next, the valve timing setting operation, which is an operation that is a characteristic of this example embodiment, will be described. In brief, this valve timing setting operation involves setting a valve timing that will reduce vibration (i.e., a vibration-reducing valve timing) as the optimum valve timing capable of minimizing engine vibration during idling, when two conditions are satisfied. One of the conditions is that the engine 1 be idling and the other condition is that the vehicle be stopped. More specifically, in this example embodiment, the valve timing is set such that the overlap amount of the intake valve 13 and the exhaust valve 14 is small. As a result, vibration of the engine 1 while the vehicle is stopped can be reduced.

Figure 5:
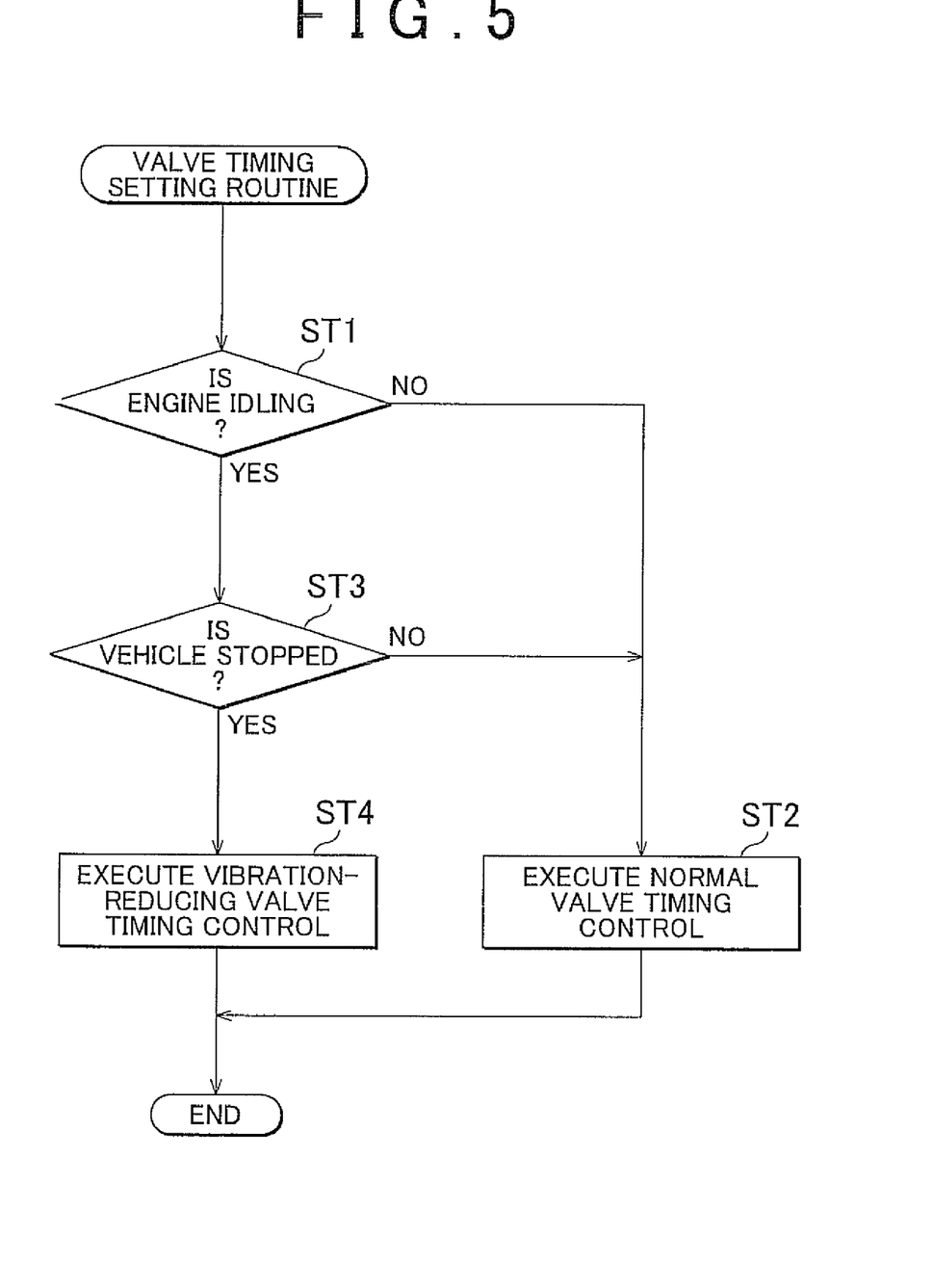
FIG. 5 is a flowchart illustrating the steps in a VVT valve timing setting operation.

Hereinafter, this valve timing setting operation will be described in detail with reference to the flowchart in FIG. 5. The valve timing setting routine shown in FIG. 5 is executed repeatedly at predetermined intervals of time (such as every several milliseconds) after the engine has been started and has finished warming up.

First, in step ST1, it is determined whether the engine 1 is idling. This determination is made based on an engine speed signal that is output from the crank position sensor 37 and an accelerator operation amount signal that is output from the accelerator operation amount sensor 35, for example. That is, it is determined that the engine 1 is idling when the engine speed is a predetermined idling speed (such as 700 rpm) and the accelerator operation amount is 0.

If the engine 1 is not idling, in which case the determination in step ST1 is no, the process proceeds on to step ST2, where normal control is performed for the valve timing control of the intake side VVT 100*in* and the exhaust side VVT 100*ex*. For example, the overlap amount is set larger as the engine speed increases in order to obtain an overlap amount that corresponds to the engine speed. One way to set the overlap amount large in this way is to increase the advance amount of the intake valve 13 that is adjusted by the intake side VVT 100*in* and increase the retard amount of the exhaust valve 14 that is adjusted by the exhaust side VVT 100*ex*.

If, on the other hand, the engine 1 is idling, in which case the determination in step ST1 is yes, the process proceeds on to step ST3, where it is determined whether the vehicle is stopped. This determination is made based on a vehicle speed signal that is output from the vehicle speed sensor 30.

If the vehicle is traveling, in which case the determination in step ST3 is no, the process proceeds on to step ST2, where normal control is performed, just as described above, for the valve timing control of the intake side VVT 100*in* and the exhaust side VVT 100*ex*. That is, when the vehicle is traveling, a relatively large overlap amount is maintained even if the engine 1 is idling. If the vehicle is traveling, it is conceivable that the driver may depress the accelerator, thus increasing the engine load, so this operation maintains a relatively large overlap amount in preparation for such an increase in engine load, even if the accelerator operation amount is 0. As a result, when the driver depresses the accelerator again while the vehicle is traveling, an overlap amount suitable for an increase in engine speed that accompanies the increase in engine load can be quickly obtained, thus enabling the engine output required by the driver to be obtained quickly (i.e., with good response).

If, on the other hand, the vehicle is stopped, in which case the determination in step ST3 is yes, the process proceeds on to step ST4, where the valve timing is controlled to a vibration-reducing valve timing (i.e., controlled to a vibration-reducing valve timing by a valve timing control device) as the valve timing control of the intake side VVT 100*in* and the exhaust side VVT ex.

This vibration-reducing valve timing is a valve timing in which the overlap amount of the intake valve 13 and the exhaust valve 14 from the exhaust stroke through the intake stroke is set smaller than the overlap amount when the engine 1 is not idling and smaller than the overlap amount when the engine 1 is idling and the vehicle is traveling. That is, the intake side VVT 100*in* and the exhaust side VVT 100*ex* are controlled to obtain an overlap amount that is smaller than the overlap amount set in step ST2. In other words, the overlap amount is set even smaller than the smallest set overlap amount in the adjustable range of the overlap amount that is adjusted in step ST2 described above. For example, when the smallest overlap amount in the normal valve timing control (i.e., step ST2) is 5° of crank angle, the overlap amount at the vibration-reducing valve timing is set to 2° of crank angle. The values are not limited to those described here, but may be set appropriately through testing or simulation or the like. Also, one way of setting the overlap amount small in this way is to increase the retard amount of the intake valve 13 that is adjusted by the intake side VVT 100*in* and increase the advance amount of the exhaust valve 14 that is adjusted by the exhaust side VVT 100*ex*.

Figure 6:
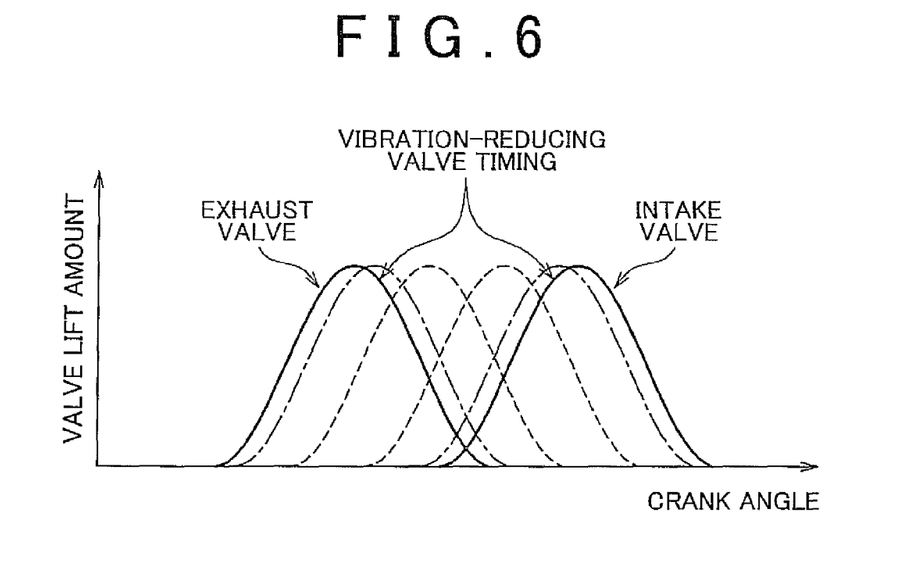
FIG. 6 is a graph showing the opening/closing timing of an intake valve and an exhaust valve according to the example embodiment.

FIG. 6 is a graph showing the opening/closing timing of the intake valve 13 and the exhaust valve 14 according to operation of the intake side VVT 100*in* and the exhaust side VVT 100*ex*.

The broken lines in FIG. 6 show a case in which the engine speed is relatively high and the overlap amount of the intake valve 13 and the exhaust valve 14 is set large when normal control is performed as the valve timing control of the intake side VVT 100*in* and the exhaust side VVT 100*ex* (i.e., during the control in step ST2). Also, the alternate long and short dash lines in FIG. 6 show a case in which the engine speed is relatively low and the overlap amount of the intake valve 13 and the exhaust valve 14 is set small when normal control is performed as the valve timing control of the intake side VVT 100*in* and the exhaust side VVT 100*ex* (i.e., during the control in step ST2). That is, the overlap amount is adjusted by performing valve timing control between the valve timing shown by the broken lines and the and the valve timing shown by the alternate long and short dash lines while the vehicle is traveling.

The solid lines in FIG. 6 show a state in which the overlap amount is set to the vibration-reducing overlap amount when the engine 1 is idling and the vehicle is stopped (i.e., the control in step ST4 described above).

In this way, the overlap amount is set to the vibration-reducing overlap amount when the engine 1 is idling and the vehicle is stopped. As a result, vibration of the engine 1 while the vehicle is stopped can be reduced, so discomfort to the occupants can be minimized. Also, in this example embodiment, the normal valve timing control is performed when the vehicle is traveling, even if the engine 1 is idling. The vibration-reducing valve timing will not be set. As a result, when the load of the engine 1 is increased by the driver depressing the accelerator or the like while the vehicle is traveling, and the engine speed increases as a result, a valve timing that corresponds to that increase (i.e., a valve timing at which a large overlap amount can be obtained) can be quickly obtained. In this way, according to this example embodiment, vibration of the engine 1 while the vehicle is stopped can be reduced and the proper valve timing while the vehicle is traveling can be maintained.

Also, the combustion in the combustion chamber 1*d* can be stably performed because the overlap amount is set small while the vehicle is stopped, so exhaust gas emissions can also be improved.

First Modified Example

Next, a first modified example of the example embodiment of the invention will be described. In the example embodiment described above, the vibration-reducing valve timing sets the overlap amount of the intake valve 13 and the exhaust valve 14 small.

Alternatively, the vibration-reducing valve timing may set the overlap amount of the intake valve 13 and the exhaust valve 14 to 0 or a negative overlap. This negative overlap control is control that adjusts the opening/closing timing of the intake valve 13 and the exhaust valve 14 so that both of these valves 13 and 14 are closed from the exhaust stroke through the intake stroke.

Figure 7:
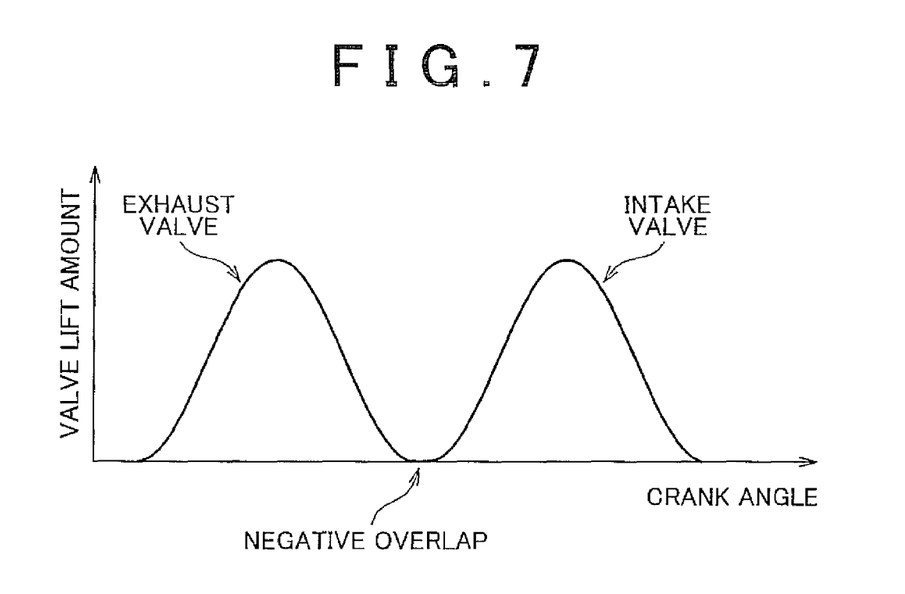
FIG. 7 is a graph showing the opening/closing timing of the intake valve and the exhaust valve when the overlap amount of these valves has been set to a negative overlap in a first modified example of the example embodiment of the invention.

FIG. 7 is a graph showing the opening/closing timing of the intake valve 13 and the exhaust valve 14 when the overlap amount of these valves 13 and 14 has been set to a negative overlap when the engine 1 is idling and the vehicle is stopped.

In this way, even if the overlap amount of the intake valve 13 and the exhaust valve 14 is set to 0 or a negative overlap when the engine 1 is idling and the vehicle is stopped, vibration of the engine 1 while the vehicle is stopped can be reduced so discomfort to the occupants can be minimized, just as with the example embodiment described above. Also, the normal valve timing control is performed (i.e., vibration-reducing valve timing is not set) when the vehicle is traveling even if the engine 1 is idling, so if the load of the engine 1 is increased by the driver depressing the accelerator or the like while the vehicle is traveling, and the engine speed increases as a result, a valve timing that corresponds to that increase (i.e., a valve timing at which a large overlap amount can be obtained) can be quickly obtained.

Second Modified Example

Next, a second modified example of the example embodiment of the invention will be described. This second modified example relates to an operation when canceling the setting in which the valve timing is set to the vibration-reducing valve timing.

More specifically, when the state of the vehicle changes from one in which the vehicle is stopped with the engine 1 idling to one in which the vehicle starts to take off with the engine 1 idling, the setting in which the valve timing is set to the vibration-reducing valve timing is canceled and the overlap amount of the intake valve and the exhaust valve is increased.

More specifically, as described in the example embodiment and the first modified example described above, the control that sets the overlap amount of the intake valve 13 and the exhaust valve 14 small is canceled and valve timing control according to the intake side VVT 100*in* and the exhaust side VVT 100*ex* to gradually increase this overlap amount is started when a brake ON signal from a brake pedal sensor, not shown, is canceled while the overlap amount of the intake valve 13 and the exhaust valve 14 is set small or to a negative overlap when the engine 1 is idling and the vehicle is stopped.

For example, regardless of a change in the engine speed, i.e., even if the engine speed has not yet increased, the overlap amount is increased by 2° of crank angle per second and set large in advance in preparation for an increase in the engine speed due to the driver depressing the accelerator thereafter. The value of the increase amount in the overlap amount per this unit time is not limited to that described here, but may be set as appropriate. In this way, increasing the overlap amount from the moment the vehicle takes off from a standstill enables an appropriate overlap amount for obtaining the required engine output to be obtained quickly, which in turn enables the required engine output to be quickly obtained, when the driver later depresses the accelerator.

Third Modified Example

Next, a third modified example of the example embodiment of the invention will be described. In the example embodiment and modified examples described above, the vibration-reducing valve timing sets the overlap amount of the intake valve 13 and the exhaust valve 14 small.

Alternatively, in this third modified example, the vibration-reducing valve timing sets the overlap amount of the intake valve 13 and the exhaust valve 14 large. Hereinafter, this vibration-reducing valve timing will be described in detail.

Figure 8:
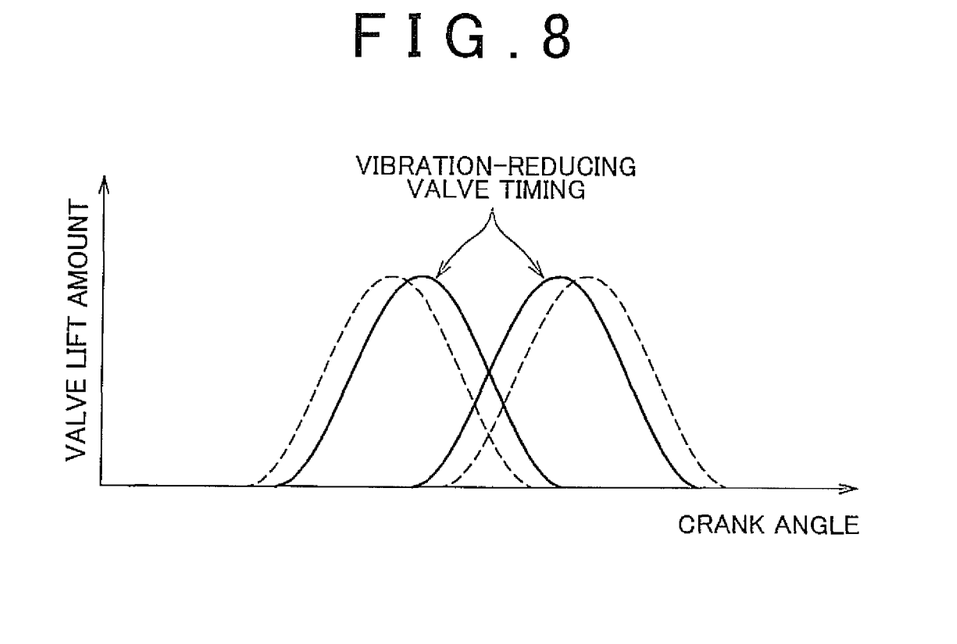
FIG. 8 is a graph showing the opening/closing timing of the intake valve and the exhaust valve according to a third modified example of the example embodiment of the invention.

FIG. 8 is a graph showing the opening/closing timing of the intake valve 13 and the exhaust valve 14 according to operation of the intake side VVT 100*in* and the exhaust side VVT 100*ex* in this third modified example.

The broken lines in FIG. 8 show the valve timing of the intake valve 13 and the exhaust valve 14 during idling when normal control is performed (i.e., when the vehicle is traveling) as the valve timing control of the intake side VVT 100*in* and the exhaust side VVT 100*ex*.

The solid lines in FIG. 8 show the valve timing of the intake valve 13 and the exhaust valve 14 when the engine 1 is idling and the vehicle is stopped, and indicate a state in which the overlap amount is set to the vibration-reducing overlap amount.

In this way, the overlap amount is set larger (i.e., to the vibration-reducing overlap amount) when the engine 1 is idling and the vehicle is stopped than it is when the engine 1 is idling and the vehicle is traveling.

Setting the overlap amount large in this way increases the actual compression ratio of the compression stroke while the engine 1 is idling, and thus increases the charging efficiency of air in the combustion chamber 1*d*. Therefore, combustion in the combustion stroke can be stably performed, so vibration of the engine 1 while the vehicle is stopped can be reduced. As a result, discomfort to the occupants can be minimized. Also, in the third modified example, the normal valve timing control can be performed (i.e., the vibration-reducing valve timing is not set) when the vehicle is traveling, even if the engine 1 is idling. Therefore, the overlap amount will not become too large for the engine speed while the vehicle is traveling. In this way, in this third modified example as well, vibration of the engine 1 while the vehicle is stopped can be reduced and the proper valve timing while the vehicle is traveling can be maintained.

In particular, as in this third modified example, vibration-reducing valve timing in which the overlap amount of the intake valve 13 and the exhaust valve 14 is set large is remarkably effective in the engine 1 in which the overlap amount of the intake valve 13 and the exhaust valve 14 is set to a negative overlap in normal valve timing control.

Figure 9:
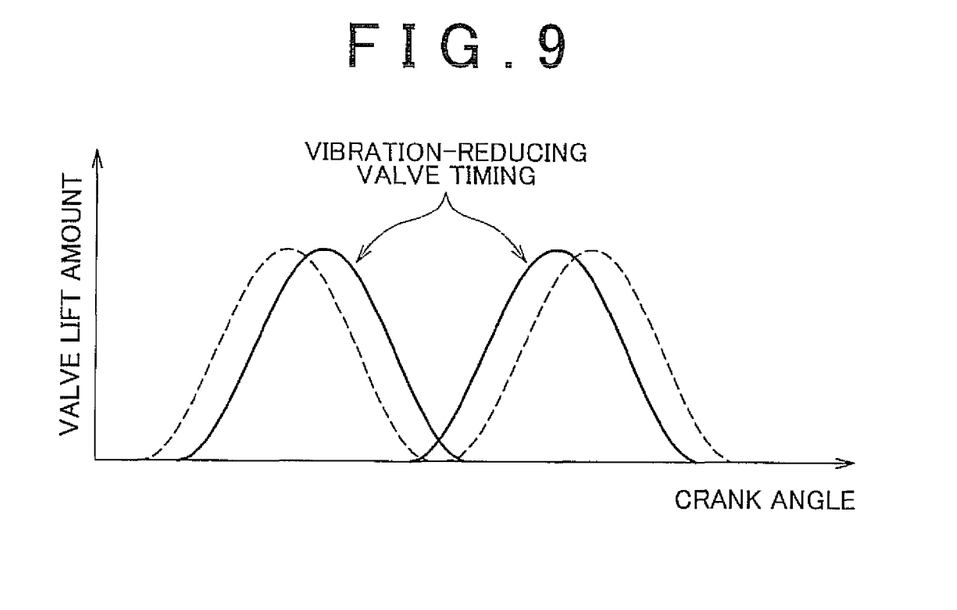
FIG. 9 is a graph showing the opening/closing timing of the intake valve and the exhaust valve when the overlap amount is set to a negative overlap by normal control according to the third modified example.

FIG. 9 is a graph showing the opening/closing timing of the intake valve 13 and the exhaust valve 14 when the overlap amount is set to a negative overlap in normal control valve timing control.

The broken lines in FIG. 9 show a state in which the overlap amount of the intake valve 13 and the exhaust valve 14 is set to a negative overlap when normal control is being performed (e.g., when the engine 1 is idling and the vehicle is traveling) as the valve timing control of the intake side VVT 100*in* and the exhaust side VVT 100*ex*.

The solid lines in FIG. 9 shows the valve timing of the intake valve 13 and the exhaust valve 14 when the engine 1 is idling and the vehicle is stopped, and indicates a state in which the overlap amount is set to the vibration-reducing overlap amount. That is, the valve timing of the intake valve 13 and the exhaust valve 14 is set such that the overlap amount of the intake valve 13 and the exhaust valve 14 ceases to be a negative overlap and instead becomes a predetermined overlap amount (i.e., an overlap amount with which engine vibration while the vehicle is stopped can be reduced).

Fourth Modified Example

Next, a fourth modified example of the example embodiment of the invention will be described. This fourth modified example relates to the operation when canceling the setting in which the valve timing is set to the vibration-reducing valve timing in the third modified example described above.

More specifically, the setting in which the valve timing is set to the vibration-reducing valve timing is canceled and the overlap amount of the intake valve and the exhaust valve is reduced when the state of the vehicle changes from one in which the vehicle is stopped with the engine 1 idling to one in which the vehicle starts to take off with the engine 1 idling.

More specifically, as described in the third modified example above, the control that sets the overlap amount of the intake valve 13 and the exhaust valve 14 large is canceled and valve timing control according to the intake side VVT 100*in* and the exhaust side VVT 100*ex* to gradually decrease this overlap amount is started when a brake ON signal from a brake pedal sensor, not shown, is canceled while the overlap amount of the intake valve 13 and the exhaust valve 14 is set large when the engine 1 is idling and the vehicle is stopped.

For example, regardless of a change in the engine speed, the overlap amount is decreased by 2° of crank angle per second and set to a proper value when the vehicle is traveling. The value of the decrease amount in the overlap amount per this unit time is not limited to that described here, but may be set as appropriate. In this way, decreasing the overlap amount from the moment the vehicle starts to take off from a standstill enables the appropriate overlap amount to be obtained quickly, which in turn enables the required engine output to be quickly obtained.

Incidentally, the technology that sets the overlap amount small for the vibration-reducing valve timing, as described in the example embodiment and the first and second modified examples described above, may be combined with the technology that sets the overlap amount large for the vibration-reducing valve timing, as described in the third and fourth modified examples described above.

That is, the overlap amount and engine vibration conditions when the engine 1 is idling and the vehicle is stopped may be recognized through testing or simulation or the like, for example, and the effect of suppressing engine vibration by setting the overlap amount small (i.e., the effect from the control of the example embodiment and the first and second modified examples) may be compared with the effect of suppressing engine vibration by setting the overlap amount large (i.e., the effect from the third and fourth modified examples). A determination may then be made to set the overlap amount either small or large, whichever is able to obtain the greatest effect (i.e., whichever is able to reduce the engine vibration more). Valve timing control of the intake valve VVT 100*in* and the VVT 100*ex* may then be executed based on this determination.

Other Example Embodiments

In the example embodiment and modified examples the engine is provided with a vane type VVT, but the invention is not limited to this. That is, the invention may also be applied to an engine that is provided with another type of VVT such as a helical spline type VVT. Also, the invention is not limited to the VVT being a hydraulic VVT. That is, the invention may also be applied to an engine that is provided with an electric VVT.

Moreover, the invention may also be applied to an engine that is provided with electromagnetically-driven valves for the intake and exhaust valves, such that these intake and exhaust valves are driven open and closed by the electromagnetic force of an electromagnet.

Also, in the example embodiment and modified examples described above, the overlap amount of the intake valve 13 and the exhaust valve 14 are adjusted by controlling both the intake side VVT 100*in* and the exhaust side VVT 100*ex*. The invention is not limited to this, however. That is, the overlap amount may also be adjusted using only one of the VVTs.

Further, the invention is not limited to being applied to an engine that is provided with a variable valve timing mechanism for both the intake system and the exhaust system. That is, the invention may also be applied to an engine provided with a variable valve timing mechanism for only one of those systems (such as only the intake system).

Furthermore, in the example embodiment and modified examples described above, the invention is applied to a port injection type gasoline engine. However, the invention may also be applied to the control of an in-cylinder direct injection gasoline engine provided with VVT. Moreover, the invention may also be applied to an inline multiple cylinder gasoline engine as well as a V-type multiple cylinder gasoline engine and the like.

Also, in the example embodiment and modified examples described above, the invention is applied to a vehicle provided with a gasoline engine. However, the invention may also be applied to a vehicle provided with another type of engine such as a diesel engine. Also, the power source of the vehicle may be a hybrid power source in which an electric motor is provided in addition to an engine (an internal combustion engine). Typically in a hybrid vehicle, so-called idling-stop control that stops the engine is performed when the vehicle is stopped such as while waiting at a traffic light. However, if the engine has not warmed up sufficiently or the state-of-charge (SOC) of the battery is low, the engine will continue to idle even when the vehicle is stopped. This invention may also be applied as control in this kind of situation.

The invention can be applied to valve timing control for reducing engine vibration during idling in an engine that is provided with a variable valve timing mechanism.

What is claimed is:

1. A control apparatus for an internal combustion engine of a vehicle, comprising:
    an intake passage that is communicated with a combustion chamber;
    an exhaust passage that is communicated with the combustion chamber;
    an intake valve that selectively opens and closes communication between the combustion chamber and the intake passage;
    an exhaust valve that selectively opens and closes communication between the combustion chamber and the exhaust passage;
    a variable valve timing mechanism that is provided for at least one of the intake valve or the exhaust valve and adjusts valve timing; and
    a valve timing control device that controls the variable valve timing mechanism to set the valve timing to a vibration-reducing valve timing when the internal combustion engine is idling and the vehicle is stopped.

2. The control apparatus according to claim 1, wherein the vibration-reducing valve timing is a valve timing in which an overlap amount of the intake valve and the exhaust valve from an exhaust stroke through an intake stroke is set smaller than the overlap amount when the internal combustion engine is not idling.

3. The control apparatus according to claim 1, wherein the vibration-reducing valve timing is a valve timing that results in a negative overlap in which the intake valve and the exhaust valve are both closed from an exhaust stroke through an intake stroke.

4. The control apparatus according to claim 1, wherein the valve timing control device cancels the setting in which the valve timing is set to the vibration-reducing valve timing when the state of the vehicle changes from one in which the vehicle is stopped with the internal combustion engine idling to one in which the vehicle starts to take off with the internal combustion engine idling.

5. The control apparatus according to claim 4, wherein the valve timing control device cancels the setting in which the valve timing is set to the vibration-reducing valve timing and increases the overlap amount of the intake valve and the exhaust valve when the state of the vehicle changes from one in which the vehicle is stopped with the internal combustion engine idling to one in which the vehicle starts to take off with the internal combustion engine idling.

6. The control apparatus according to claim 1, wherein the vibration-reducing valve timing is a valve timing in which the overlap amount of the intake valve and the exhaust valve from an exhaust stroke through an intake stroke is set larger than the overlap amount when the internal combustion engine is not idling.

7. The control apparatus according to claim 6, wherein the valve timing control device cancels the setting in which the valve timing is set to the vibration-reducing valve timing and decreases the overlap amount of the intake valve and the exhaust valve when the state of the vehicle changes from one in which the vehicle is stopped with the internal combustion engine idling to one in which the vehicle starts to take off with the internal combustion engine idling.

8. A control apparatus for an internal combustion engine of a vehicle, comprising:
    an intake passage that is communicated with a combustion chamber;

an exhaust passage that is communicated with the combustion chamber;
an intake valve that selectively opens and closes communication between the combustion chamber and the intake passage;
an exhaust valve that selectively opens and closes communication between the combustion chamber and the exhaust passage;
a variable valve timing mechanism that is provided for at least one of the intake valve or the exhaust valve and adjusts valve timing; and
a valve timing control device that makes the overlap amount of the intake valve and the exhaust valve from an exhaust stroke through an intake stroke when the internal combustion engine is idling and the vehicle is stopped smaller than the overlap amount when the internal combustion engine is idling and the vehicle is traveling.

9. A control apparatus for an internal combustion engine of a vehicle, comprising:

an intake passage that is communicated with a combustion chamber;
an exhaust passage that is communicated with the combustion chamber;
an intake valve that selectively opens and closes communication between the combustion chamber and the intake passage;
an exhaust valve that selectively opens and closes communication between the combustion chamber and the exhaust passage;
a variable valve timing mechanism that is provided for at least one of the intake valve or the exhaust valve and adjusts valve timing; and
a valve timing control device that makes the overlap amount of the intake valve and the exhaust valve from an exhaust stroke through an intake stroke when the internal combustion engine is idling and the vehicle is stopped larger than the overlap amount when the internal combustion engine is idling and the vehicle is traveling.

* * * * *